United States Patent
Bahar et al.

(10) Patent No.: US 11,209,998 B2
(45) Date of Patent: Dec. 28, 2021

(54) ADJUSTMENT OF STORAGE DEVICE PARAMETERS BASED ON WORKLOAD CHARACTERISTICS

(71) Applicant: Western Digital Technologies, Inc., San Jose, CA (US)

(72) Inventors: Yuval Bahar, Rehovot (IL); Avichay Haim Hodes, Kfar Ben-Nun (IL); Alex Bazarsky, Holon (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 49 days.

(21) Appl. No.: 16/138,193

(22) Filed: Sep. 21, 2018

(65) Prior Publication Data

US 2019/0377508 A1    Dec. 12, 2019

Related U.S. Application Data

(60) Provisional application No. 62/683,519, filed on Jun. 11, 2018.

(51) Int. Cl.
*G06F 12/00*    (2006.01)
*G06F 3/06*    (2006.01)

(52) U.S. Cl.
CPC .......... *G06F 3/0634* (2013.01); *G06F 3/0605* (2013.01); *G06F 3/0631* (2013.01); *G06F 3/0632* (2013.01)

(58) Field of Classification Search
CPC .... G06F 3/0634; G06F 3/0632; G06F 3/0631; G06F 3/0605
See application file for complete search history.

(56) References Cited

U.S. PATENT DOCUMENTS

| | | | |
|---|---|---|---|
| 7,640,342 B1 | 12/2009 | Aharoni et al. | |
| 9,239,786 B2 | 1/2016 | Ki et al. | |
| 9,431,116 B2 | 8/2016 | Sun et al. | |
| 9,454,321 B1 | 9/2016 | Smaldone et al. | |
| 2010/0332922 A1* | 12/2010 | Chang | G11C 5/143 714/704 |
| 2016/0041788 A1 | 2/2016 | Lee et al. | |

(Continued)

OTHER PUBLICATIONS

Anderson, Eric et al.; "Hippodrome: Running Circles Around Storage Administration", Conference on File and Storage Technologies (FAST'02); Monterey, CA; Jan. 28-30, 2002, pp. 175-188 (15 pages).

*Primary Examiner* — Arvind Talukdar
(74) *Attorney, Agent, or Firm* — Patterson & Sheridan, LLP; Steven H. Versteeg

(57) ABSTRACT

Embodiments of the present disclosure generally relate to storage devices, such as SSDs. A data storage device comprises an encrypted interface, one or more flash memory devices, and a controller configured to receive one or more workloads of data through the encrypted interface. Upon a threshold being met, the controller performs a diagnosis of one or more operating parameters of the one or more workloads of data. Based on the diagnosis, the data storage device is optimized by recalibrating one or more of: a partitioning of bits per cell of the one or more flash memory devices, one or more flash management parameters of the data storage device, and a programming rate of the storage device.

21 Claims, 5 Drawing Sheets

(56) References Cited

U.S. PATENT DOCUMENTS

| | | | |
|---|---|---|---|
| 2016/0162185 A1* | 6/2016 | D'Abreu | G11C 16/10 |
| | | | 711/103 |
| 2018/0081543 A1* | 3/2018 | Muchherla | G06F 3/0653 |
| 2018/0081594 A1* | 3/2018 | Jung | G06F 3/0659 |
| 2018/0090201 A1* | 3/2018 | Wu | G11C 11/5628 |
| 2018/0211708 A1* | 7/2018 | Igahara | G11C 16/105 |
| 2019/0065367 A1* | 2/2019 | Li | G06F 12/0246 |
| 2019/0065388 A1* | 2/2019 | Christensen | G06F 3/0634 |
| 2019/0095116 A1* | 3/2019 | Igahara | G06F 12/10 |
| 2019/0103083 A1* | 4/2019 | Ogasawara | G10H 1/0008 |
| 2019/0243771 A1* | 8/2019 | Mittal | G06F 3/061 |

* cited by examiner

ADJUSTMENT OF STORAGE DEVICE PARAMETERS BASED ON WORKLOAD CHARACTERISTICS

CROSS-REFERENCE TO RELATED APPLICATIONS

This application claims benefit of U.S. Provisional Patent Application Ser. No. 62/683,519, filed Jun. 11, 2018, which is herein incorporated by reference.

BACKGROUND OF THE DISCLOSURE

Field of the Disclosure

Embodiments of the present disclosure generally relate to storage devices, such as solid state drives (SSDs).

Description of the Related Art

SSDs have a plurality of configuration parameters that may be set according to the anticipated needs of a user. The configuration parameters may be modified and tailored to a user's anticipated needs in order to optimize performance and endurance of the SSD. However, workloads of users are not known in advance, and thus, the optimal configuration of a data storage device is unknown. As such, some parameters of a data storage device may be optimally configured to the workload of a user while other parameters are not.

Additionally, some parameters of data storage devices of SSDs may only be configured or determined during manufacturing. For example, data storage devices may be manufactured to comprise a memory device having a memory cell configuration of a single level cell (SLC), a multi-level cell (MLC), a triple level cell (TLC), or a quadruple level cell (QLC). An SLC has better endurance, lower read/write latency, and a longer lifespan than MLCs, TLCs, and QLCs. However, the total storage size of the SLC is reduced, and is smaller than the MLCs, TLCs, and QLCs. The MLCs, TLCs, and QLCs offer higher storage capacities, but slower read/write speeds. Thus, a trade-off often occurs in data storage devices where either storage size or read/write speed must be given up based on the foreseeable needs of the user of the data storage device.

Therefore, what is needed is a data storage system that can optimize one or more configuration parameters based on a user's workload and needs, and that can reduce the trade-off between memory level cells.

SUMMARY OF THE DISCLOSURE

Embodiments of the present disclosure generally relate to storage devices, such as SSDs. A data storage device comprises an encrypted interface, one or more flash memory devices, and a controller configured to receive one or more workloads of data through the encrypted interface. Upon a threshold being met, the controller performs a diagnosis of one or more operating parameters of the one or more workloads of data. Based on the diagnosis, the data storage device is optimized by recalibrating one or more of: a partitioning of bits per cell of the one or more flash memory devices, one or more flash management parameters of the data storage device, and a programming rate of the storage device.

In one embodiment, a method comprises receiving, by a controller of a data storage device, one or more workloads of data. A diagnosis of one or more operating parameters of the one or more workloads of data is performed. A partitioning of a flash memory device of the data storage device is recalibrated based on the diagnosis of the one or more workloads of data.

In another embodiment, a method comprises receiving a command to reconfigure a data storage device, and receiving, by a controller of the data storage device, one or more workloads of data. In response to the received command, one or more operating parameters of the one or more workloads of data are extracted. The one or more workloads of data are analyzed based on the extracted operating parameters. One or more flash management parameters of the data storage device are recalibrated based on the analysis of the one or more workloads of data.

In one embodiment, a data storage device comprises one or more flash memory devices. The one or more flash memory devices comprise a plurality of memory cells. A controller is coupled to the one or more flash memory devices. The controller is configured to receive one or more workloads of data. A diagnostic module is coupled to the controller. The diagnostic module is configured to bypass storing the one or more workloads of data in a first memory cell of the plurality of memory cells. The first memory cell comprises a single level cell. The diagnostic module is further configured to store the one or more workloads of data in a second memory cell of the plurality of memory cells. The second memory cell is configured to store two or more bits per cell.

In another embodiment, a data storage system comprises a host device and a storage device coupled to the host device. The storage device further comprises one or more flash memory devices, and a controller coupled to the one or more flash memory devices. The controller is configured to receive one or more workloads of data through the encrypted interface. The data storage device further comprises a diagnostic module coupled to the controller. The diagnostic module is configured to receive a first command to reconfigure the storage device based on a detected configuration change in a first workload of data, perform a first diagnosis of one or more operating parameters of a first workload of data, and recalibrate a partitioning of bits per cell of the one or more flash memory devices based on the first diagnosis of the first workload of data. The diagnostic module is further configured to receive a second command to reconfigure the storage device, perform a second diagnosis of one or more operating parameters of the second workload of data, and recalibrate one or more flash management parameters of the data storage device based on the second diagnosis of the second workload of data.

In yet another embodiment, a data storage device comprises one or more flash memory devices comprising a plurality of memory cells, means for extracting one or more operating parameters of the one or more workloads of data, means for analyzing the one or more workloads of data based on the extracted operating parameters, and means for recalibrating one or more data storage device parameters based on the analysis of the workload data. The means for recalibrating one or more data storage device parameters further comprises means for storing one or more workloads of data in a multi-level cell, a triple level cell, or a quadruple level cell of the one or more memory devices to provide for additional space in a single level cell of the one or more memory devices.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to storage devices, such as SSDs. A data storage device comprises an encrypted interface, one or more flash memory devices, and a controller configured to receive one or more workloads of data through the encrypted interface. Upon a threshold being met, the controller performs a diagnosis of one or more operating parameters of the one or more workloads of data. Based on the diagnosis, the data storage device is optimized by recalibrating one or more of: a partitioning of bits per cell of the one or more flash memory devices, one or more flash management parameters of the data storage device, and a programming rate of the storage device.

Figure 1:
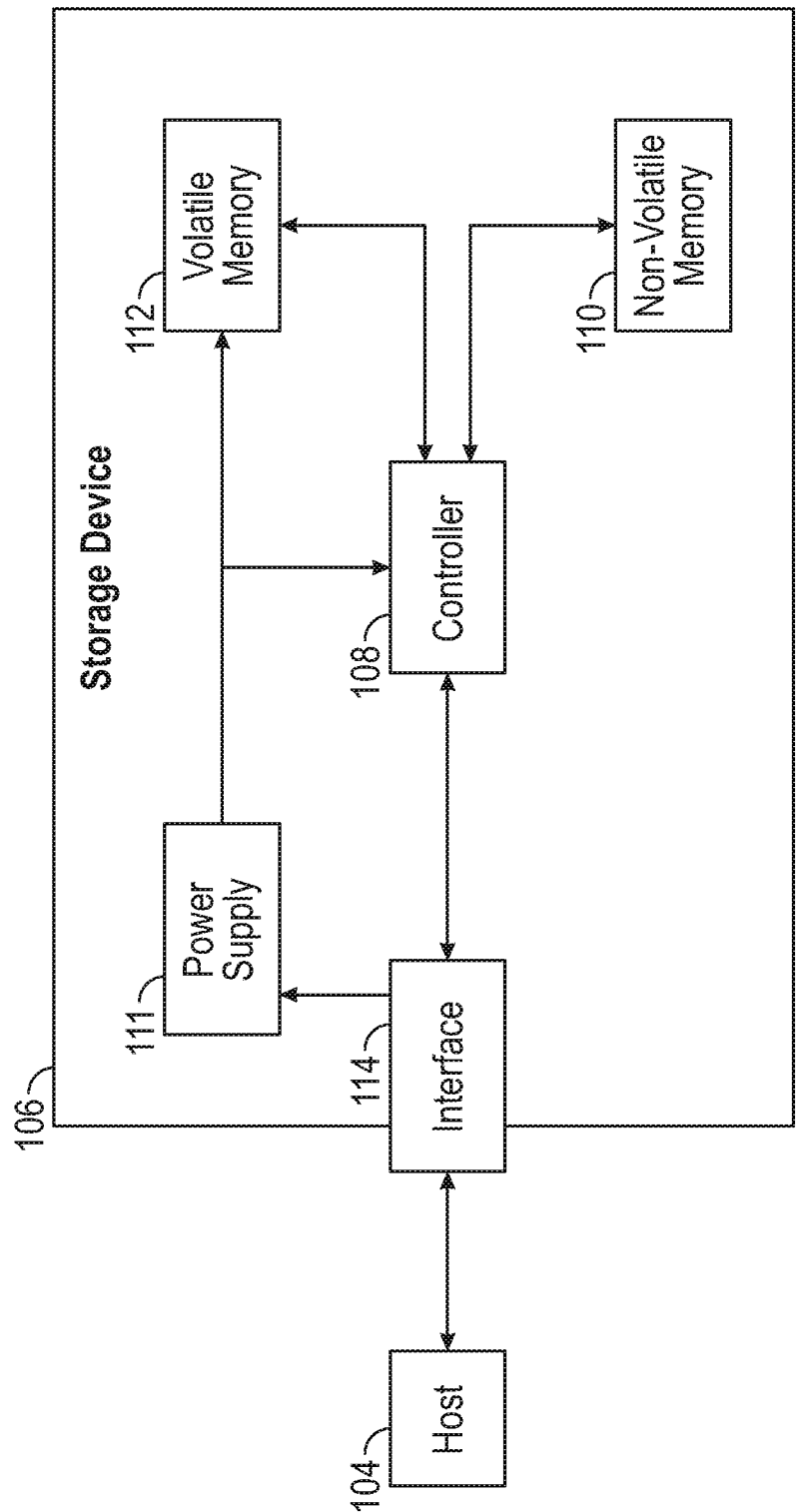
FIG. 1 is a schematic block diagram illustrating a storage system in which a storage device may function as the storage device for a host device, according to one embodiment.

FIG. 1 is a conceptual and schematic block diagram illustrating a storage system 102 in which storage device 106 may function as a storage device for host device 104, in accordance with one or more techniques of this disclosure. For instance, host device 104 may utilize non-volatile memory devices included in storage device 106 to store and retrieve data. In some examples, storage system 102 may include a plurality of storage devices, such as storage device 106, which may operate as a storage array. For instance, storage system 102 may include a plurality of storages devices 106 configured as a redundant array of inexpensive/independent disks (RAID) that collectively function as a mass storage device for host device 104.

Storage system 102 includes host device 104 which may store and/or retrieve data to and/or from one or more storage devices, such as storage device 106. As illustrated in FIG. 1, host device 104 may communicate with storage device 106 via interface 114. Host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1, storage device 106 may include controller 108, non-volatile memory 110 (NVM 110), power supply 111, volatile memory 112, and interface 114. In some examples, storage device 106 may include additional components not shown in FIG. 1 for sake of clarity. For example, storage device 106 may include a printed board (PB) to which components of storage device 106 are mechanically attached and which includes electrically conductive traces that electrically interconnect components of storage device 106, or the like. In some examples, the physical dimensions and connector configurations of storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, storage device 106 may be directly coupled (e.g., directly soldered) to a motherboard of host device 104.

Storage device 106 may include interface 114 for interfacing with host device 104. Interface 114 may include one or both of a data bus for exchanging data with host device 104 and a control bus for exchanging commands with host device 104. Interface 114 may operate in accordance with any suitable protocol. For example, interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), or the like. The electrical connection of interface 114 (e.g., the data bus, the control bus, or both) is electrically connected to controller 108, providing electrical connection between host device 104 and controller 108, allowing data to be exchanged between host device 104 and controller 108. In some examples, the electrical connection of interface 114 may also permit storage device 106 to receive power from host device 104. For example, as illustrated in FIG. 1, power supply 111 may receive power from host device 104 via interface 114.

Storage device 106 includes NVM 110, which may include a plurality of memory devices. NVM 110 may be configured to store and/or retrieve data. For instance, a memory device of NVM 110 may receive data and a message from controller 108 that instructs the memory device to store the data. Similarly, the memory device of NVM 110 may receive a message from controller 108 that instructs the memory device to retrieve data. In some examples, each of the memory devices may be referred to as a die. In some examples, a single physical chip may include a plurality of dies (i.e., a plurality of memory devices). In some examples, each memory devices may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory device of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines.

The controller 108 may write data to and read data from NAND flash memory devices at the page level and erase data from NAND flash memory devices at the block level. The controller 108 may manage one or more operations of storage device 106. For instance, controller 108 may manage the reading of data from and/or the writing of data to non-volatile memory 110. The controller 108 may be configured to receive workloads of data from the host device 104 via the interface 114. The controller may further be configured to perform a diagnosis of the data storage device 106, and may be configured to recalibrate one or more parameters of the storage device 106.

Storage device 106 includes power supply 111, which may provide power to one or more components of storage device 106. When operating in a standard mode, power supply 111 may provide power to the one or more components using power provided by an external device, such as host device 104. For instance, power supply 111 may provide power to the one or more components using power received from host device 104 via interface 114. In some examples, power supply 111 may include one or more power storage components configured to provide power to the one or more components when operating in a shutdown mode, such as where power ceases to be received from the external device. In this way, power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 106 also includes volatile memory 112, which may be used by controller 108 to store information. In some examples, controller 108 may use volatile memory 112 as a cache. For instance, controller 108 may store cached information in volatile memory 112 until cached information is written to non-volatile memory 110. As illustrated in FIG. 1, volatile memory 112 may consume power received from power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

Figure 2A:
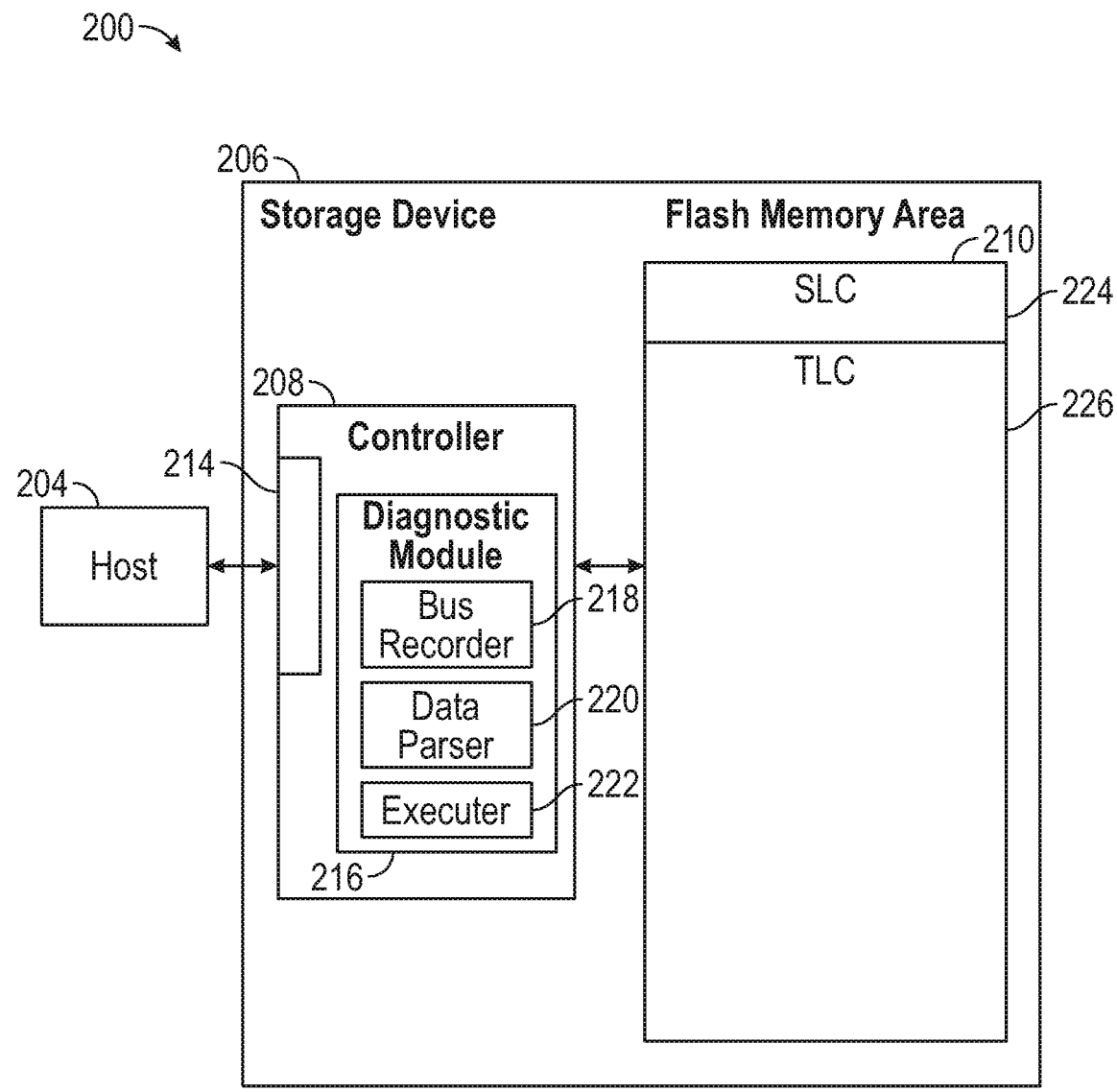
FIG. 2A and FIG. 2B illustrate schematic block diagrams of data storage systems, according to another embodiment.
Figure 2B:
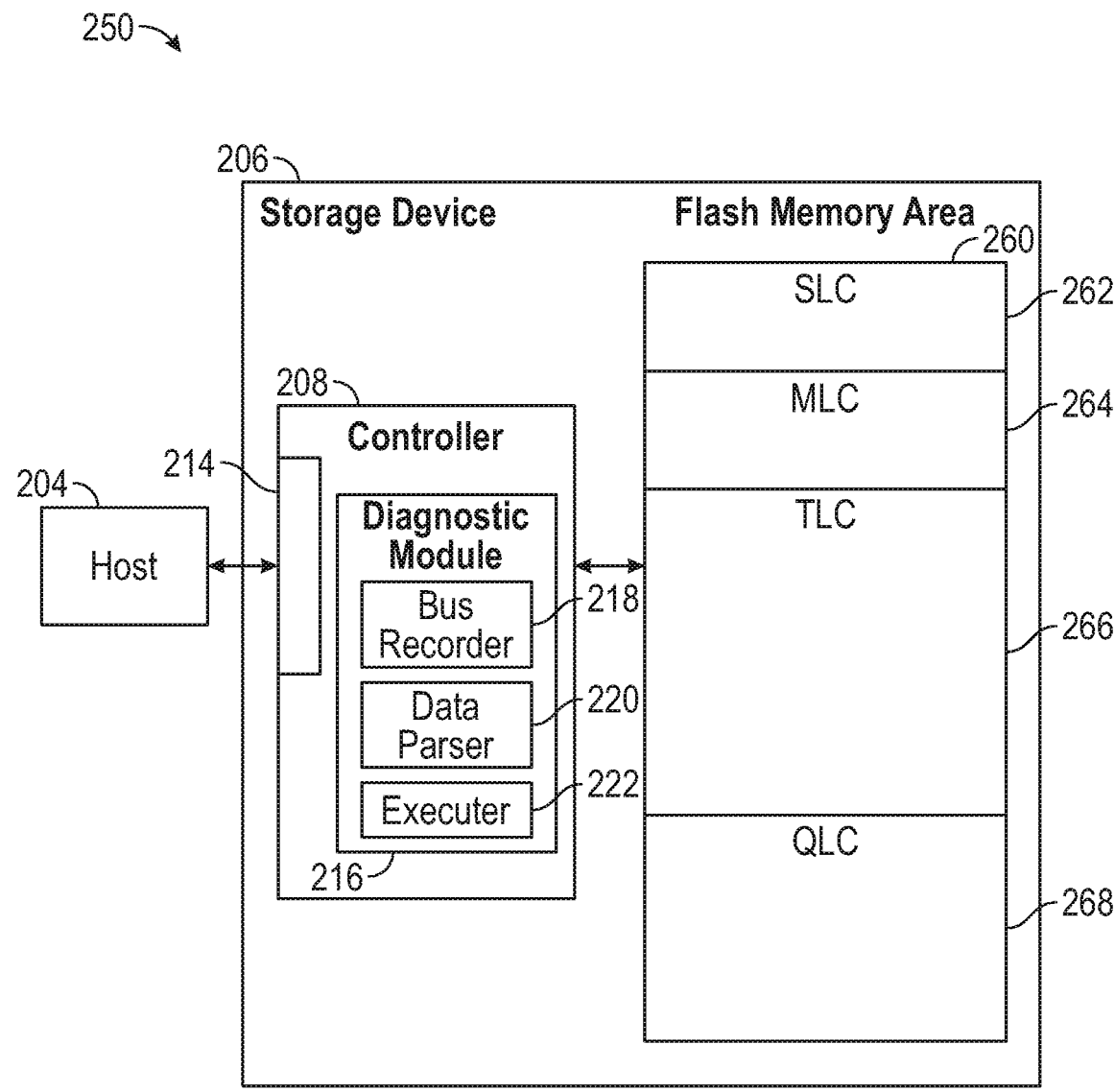

FIG. 2A and FIG. 2B illustrate schematic block diagrams of data storage systems 200 and 250, respectively, according to one embodiment. The data storage system 200 and the data storage system 250 may be the data storage system 100 of FIG. 1. Both data storage systems 200, 250 comprise a host device 204 coupled to a storage device 206. The host device 204 may be the host device 104 of FIG. 1, and the storage device 206 may be the storage device 106 of FIG. 1.

The storage device 206 comprises a controller 208 coupled to an interface 214. The controller 208 may be the controller 108 of FIG. 1, and the interface 214 may be the interface 114 of FIG. 1. The interface 214 is coupled to the host device 204. In one embodiment, the interface 214 is an encrypted interface, which allows the storage device 206 to keep data received and processed confidential from a manufacturer of the storage device 206. The controller 208 further comprises a diagnostic module 216. The diagnostic module 216 comprises a bus recorder 218, a data parser 220, and an executer 222.

In FIG. 2A, the controller 208 is coupled to a first flash memory area 210. The first flash memory area 210 comprises a SLC area 224 and a TLC area 226. The SLC area 224 is configured to store one bit per cell, and the TLC area 226 is configured to store three bits per cell. In one embodiment, the SLC area 224 and the TLC area 226 are different memory devices within the first flash memory area 210. In another embodiment, the SLC area 224 and the TLC area 226 are separate portions of the same memory device of the first flash memory area 210.

In FIG. 2B, the controller 208 is coupled to a second flash memory area 260. The second flash memory area 260 comprises a SLC area 262, a TLC area 266, a MLC area 264, and a QLC area 268. The MLC area 264 is configured to store two bits per cell, and the QLC area 268 is configured to store four bits per cell. In one embodiment, the SLC area 262, the MLC area 264, the TLC area 266, and the QLC area 268 are different memory devices within the second flash memory area 260. In another embodiment, the SLC area 262, the MLC area 264, the TLC area 266, and the QLC area 268 are separate portions of the same memory device of the second flash memory area 260. In one embodiment, the data storage device 206 may comprise a plurality of flash memory areas 210, 260, and may be comprise at least one first flash memory area 210 and at least one second flash memory area 260.

In both data storage systems 200 and 250, the controller 208 is configured to receive one or more workloads of data from the host device 204, and the flash memory areas 210, 260 are configured to store the one or more workloads of data. The diagnostic module 216 of the controller 208 is configured to perform a diagnostic test on the one or more workloads of data received, and determine how the one or more workloads of data should be partitioned and stored in the flash memory areas 210, 260.

In flash memory areas 210 and 260 having various memory level cell areas, the partition size of the data being stored in the flash area 210, 260 can be adjusted. For example, the diagnostic module 216 may determine that a workload of data, such as a workload of random data, need not be stored in a SLC area 224, 262, and may effectively be stored in the MLC area 264, TLC area 226 or 266, or QLC area 268 to utilize additional space in the SLC area to increase the endurance of the storage device 206. Thus, if the diagnostic module 216 determines a workload of data does not require a faster read/write speed or will not be overwritten frequently to decrease the lifespan of the flash memory area 210, 260, the diagnostic module 216 may conclude the overall performance of the storage device 206 would be improved if the workload of data were stored in a memory level cell having two or more bits per cell.

The diagnostic module 216 or controller 208 may further determine whether one or more flash management parameters of the storage device 206 should be adjusted to enhance the performance of the storage device 206. The diagnostic module 216 or controller 208 may determine a programming rate or programming trim of the storage device 216 needs to be altered for optimization. The partitioning of the flash memory areas 210, 260 may be restructured to be used with the different programming rates or programming trims. In one embodiment, the SLC area 224 or 262, the MLC area 264, the TLC area 226 or 266, and/or the QLC area 268 may be divided into several partitions having different trim parameters. The partitioning of the flash memory areas 210, 260 may be restructured by word lines, blocks, or other values based on the altered programming/reading trim.

Figure 3:
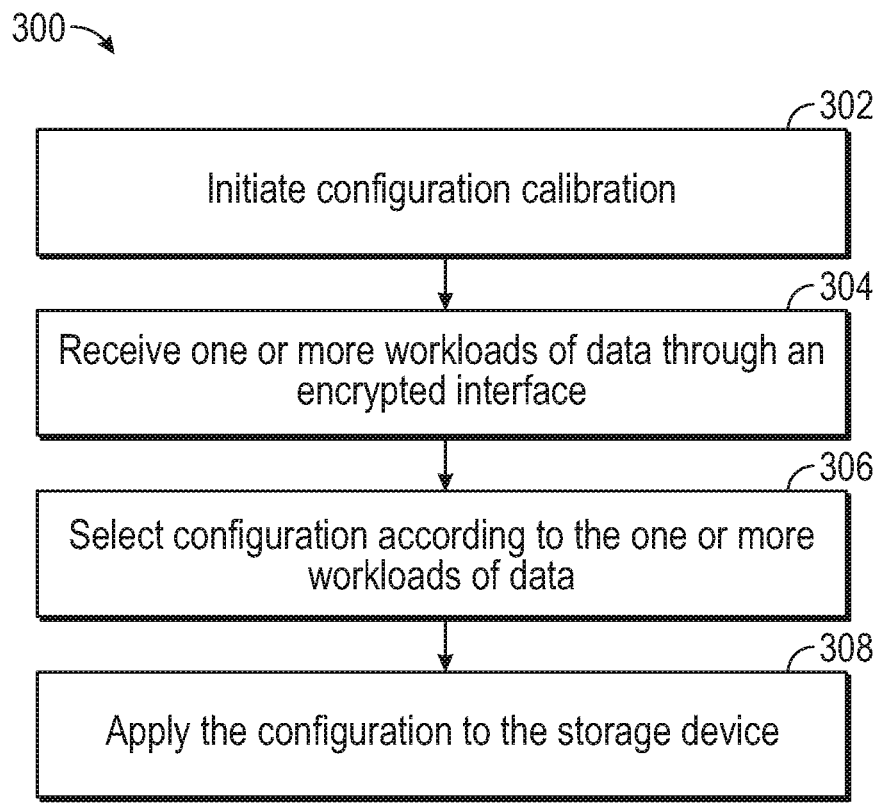
FIG. 3 illustrates a method of reconfiguring a data storage system, according to one embodiment.

FIG. 3 illustrates a method 300 of reconfiguring a data storage system, according to one embodiment. The method 300 may be used on the data storage system 100 of FIG. 1, the data storage system 200 of FIG. 2A, or the data storage system 250 of FIG. 2B. The data storage system may comprise a host device and a storage device, such as host device 204 of FIGS. 2A and 2B, and the storage device 206 of FIGS. 2A and 2B.

In operation 302 of method 300, a configuration calibration is initiated. The configuration calibration may be initiated upon a threshold being met. In one embodiment, the threshold may be a detected configuration change in the workloads of data being received by the data storage system. For example, the detected configuration change may be any major change, such as a change in the type of data being received and processed or recognizing a new job. The detected configuration change may meet the threshold if a data storage device stops receiving primarily random data and starts receiving primarily sequential data.

In another embodiment, the threshold may be a predetermined amount of time, such as at set points during the life of the data storage system. Another threshold may be after a set number of programming rate cycles has been completed. For example, the threshold may be met after every hundredth programming rate cycle is completed. Yet another threshold may be upon receiving instructions from a user of the data storage system.

In operation 304, one or more workloads of data are received through an encrypted interface of the controller. The encrypted interface may be interface 214 of FIGS. 2A and 2B. In operation 306, a configuration is selected according to the one or more workloads of data. The configuration may include recalibrating one or more of: a partitioning of bits per cell of a flash memory device of the data storage device, one or more flash management parameters of the data storage device, and a programming rate or programming trim of the storage device. In operation 308, the configuration is applied to the data storage device to optimize the data storage device.

Figure 4:
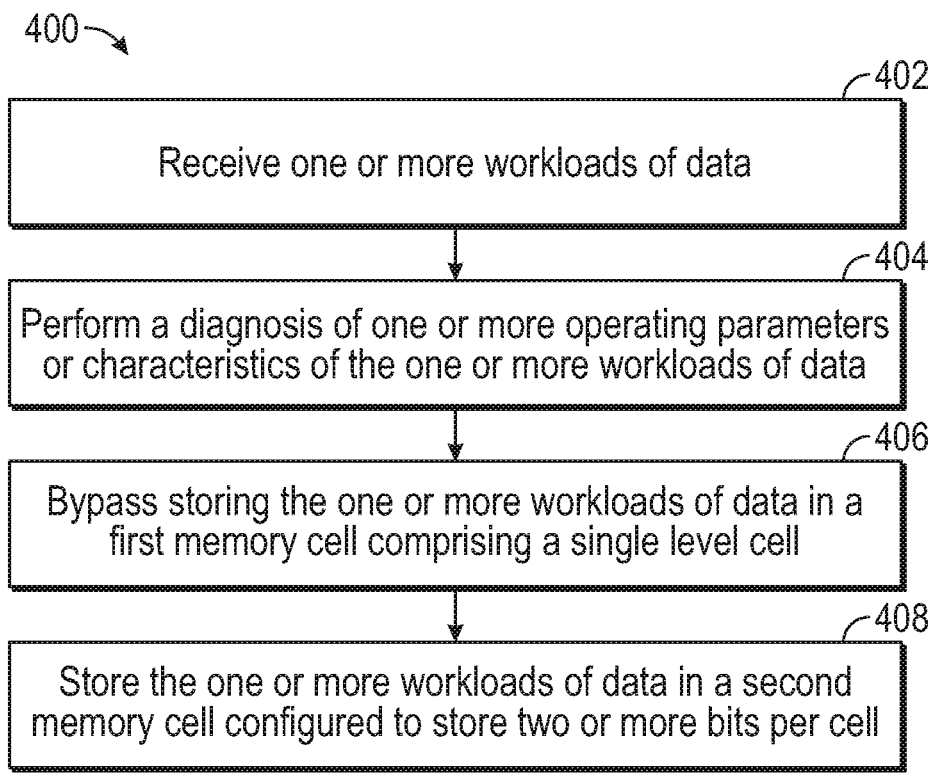
FIG. 4 illustrates a method for recalibrating a data storage system, according to another embodiment.

FIG. 4 illustrates a method 400 for reconfiguring or recalibrating a data storage system, according to another embodiment. The method 400 may be used with method 300. For example, method 400 may be used in operation 306 of method 300 of FIG. 3. The method 400 may be used on the data storage system 100 of FIG. 1, the data storage system 200 of FIG. 2A, or the data storage system 250 of FIG. 2B. The data storage system may comprise a host device and a storage device, such as host device 204 of FIGS. 2A and 2B, and the storage device 206 of FIGS. 2A and 2B. The storage device may comprise one or more flash memory devices having a plurality of memory cells, such as the flash memory areas 210 and 260 of FIGS. 2A and 2B, respectively.

In operation 402, one or more workloads of data are received by a controller, such as controller 208 of FIGS. 2A and 2B. The one or more workloads of data may be received through an encrypted interface, such as interface 214 of FIGS. 2A and 2B.

In operation 404, a diagnosis of one or more operating parameters or characteristics of the one or more workloads of data is performed. The diagnosis may be performed in the controller, or in a diagnostic module of a controller, such as diagnostic module 216 of FIGS. 2A and 2B. The one or more operating parameters or characteristics may include one or more of: queue depth, a logical block address access distribution, a transfer size distribution, a solid performance/burst, and a determined mix of sequential and random data of the one or more workloads of data.

In operation 406, storing the one or more workloads of data in a first memory cell comprising a SLC is bypassed. Storing the workloads of data in a SLC may be bypassed as a result of the diagnosis performed on the one or more operating parameters in operation 404. For example, the diagnosis may determine that a workload of data need not be stored in the SLC, allowing the additional space in the SLC to be utilized to increase the endurance of the one or more flash memory devices.

In operation 408, the one or more workloads of data are stored in a second memory cell configured to store two or more bits per cell. The second memory cell may comprise a MLC, a TLC, or a QLC. In one embodiment, the one or more workloads of data may first be stored in the first memory cell prior to storing the one or more workloads of data in the second memory cell. By determining one or more workloads of data should be stored in the MLC, TLC, or QLC rather than in the SLC, the durability, lifespan, and overall performance of the one or more memory devices can be improved, as such a determination is based directly upon the current requirements of the storage system.

The method 400 permits the storage device to periodically reconfigure or recalibrate the plurality of memory cells by determining a new partition size for the workloads of data to the memory cells based on the exact needs of the data storage system. By bypassing the first memory cell to store the one or more workloads of data in the second memory cell, the data storage system is able to determine the best partitioning of the workloads of data to enhance the performance and endurance of the flash memory devices and the storage device.

Figure 5:
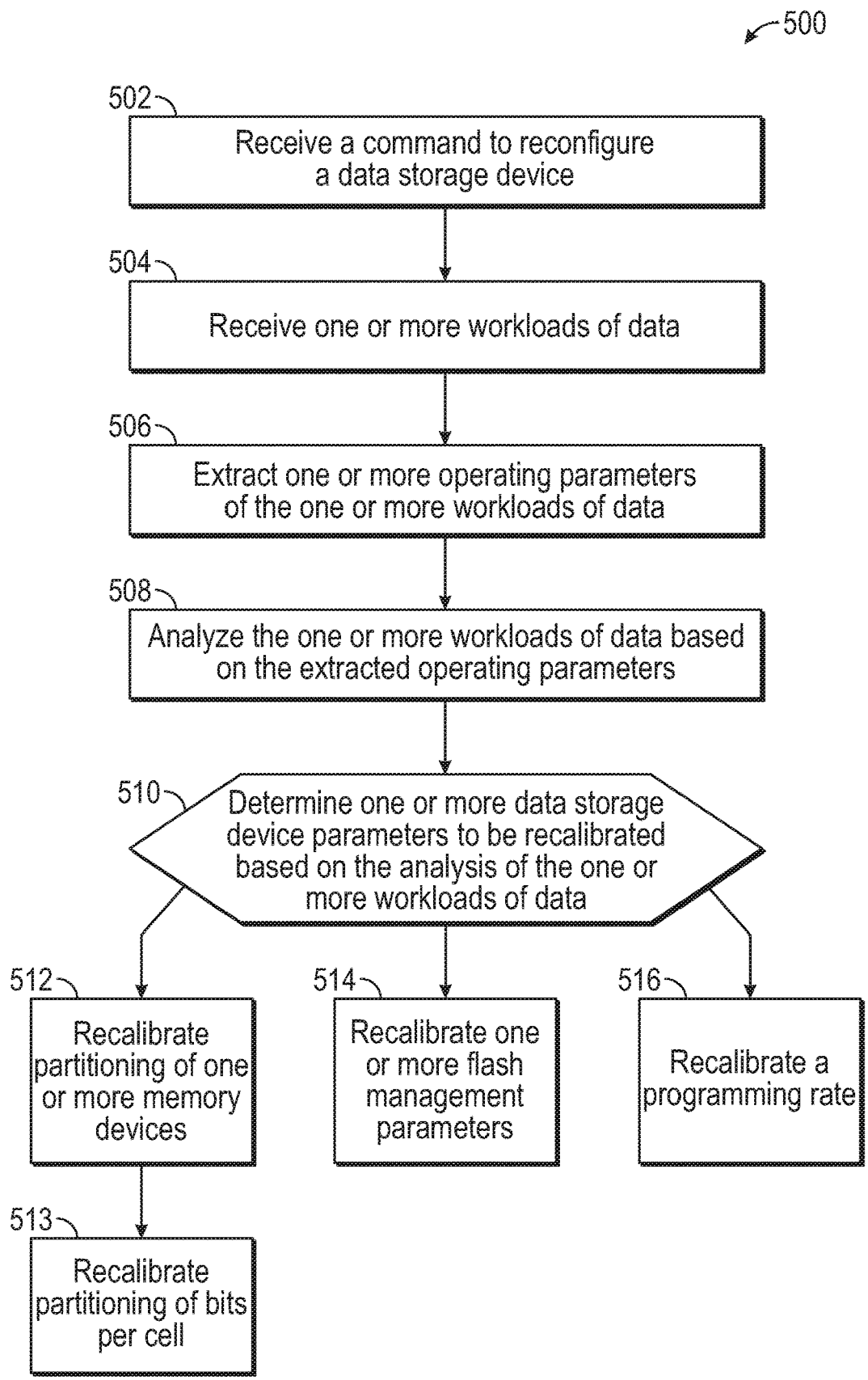
FIG. 5 illustrates a method for recalibrating a data storage system, according to yet another embodiment.

FIG. 5 illustrates a method 500 for recalibrating a data storage system, according to yet another embodiment. The method 500 may be used with both method 300 and/or method 400. For example, the method 500 may be used in operation 306 of method 300 of FIG. 3, or in operation 404 of method 400 of FIG. 4. The method 500 may be used on the data storage system 100 of FIG. 1, the data storage system 200 of FIG. 2A, or the data storage system 250 of FIG. 2B. The data storage system may comprise a host device and a storage device, such as host device 204 of FIGS. 2A and 2B, and the storage device 206 of FIGS. 2A and 2B. The storage device may comprise one or more flash memory devices having a plurality of memory cells, such as the flash memory areas 210 and 260 of FIGS. 2A and 2B, respectively.

In operation 502 of method 500, a command is received to reconfigure a data storage device. The command may be received by a controller of the data storage device, such as the controller 208 of FIGS. 2A and 2B. The command may be received in response to a threshold being reached. The threshold may be a detected configuration change in the workloads of data being received by the data storage system. For example, the detected configuration change may be any major change, such as a change in the type of data being received and processed or recognizing a new job. The detected configuration change may meet the threshold if a storage device stops receiving primarily random data and starts receiving primarily sequential data. In one embodiment, the threshold may be a predetermined amount of time, such as at set points during the life of the data storage system. Another threshold may be after a set number of programming rate cycles has been completed. For example, the threshold may be met after every hundredth programming rate cycle is completed. Yet another threshold may be upon receiving instructions from a user of the data storage system.

In operation 504, one or more workloads of data are received. The one or more workloads of data may be received by the controller through an interface, such as the interface 214 of FIGS. 2A and 2B. The interface may be an encrypted interface.

In operation 506, one or more operating parameters or characteristics of the one or more workloads of data are extracted in response to the threshold being reached. The one or more operating parameters or characteristics may include one or more of: queue depth, a logical block address access distribution, a transfer size distribution, a solid performance/burst, and a determined mix of sequential and random data of the one or more workloads of data.

In operation 508, the one or more workloads of data are analyzed based on the extracted operating parameters or characteristics. The one or more workloads of data may be analyzed to determine the efficiency at which the storage device is functioning based on the extracted operating parameters or characteristics. The analysis may include analyzing the overall performance of the storage device, and monitoring and measuring the one or more workloads of data.

In operation 510, a determination is made regarding which, if any, of one or more data storage parameters are to be recalibrated based on the analysis of the one or more workloads of data. If, in operation 508, the analysis determines any of the one or more extracted operating parameters or characteristics could be improved, operation 510 determines which data storage parameters should be recalibrated or reconfigured for optimization.

In operation 512, a partitioning of the one or more flash memory devices of the storage device are recalibrated. The partitioning of the one or more flash memory areas may be restructured to be used with the different programming rates or programming trims. In one embodiment, an SLC, an MLC, a TLC, and/or a QLC may be divided into several partitions having different trim parameters. The partitioning of the one or more flash memory areas may be restructured by word lines, blocks, or other values based on the altered programming/reading trim.

In at least one implementation, operation 512 proceeds to operation 513, where a partitioning of bits per cell of the one or more flash memory devices is recalibrated. In a flash memory device having various memory level cells, such as SLC, MLC, TLC, and/or QLC, the partition size of the data being stored in the flash memory device can be adjusted and optimized. For example, the analysis performed in operation 508 may conclude that a workload of data, such as a workload of random data, need not be stored in an SLC, and may be effectively stored in an MLC, TLC, or QLC. Storing a workload of data in the MLC, TLC, or QLC rather than the SLC allows the additional space in the SLC to be utilized to increase the endurance of the storage device. Thus, if the analysis determines a workload of data does not require a faster read/write speed or will not be overwritten frequently to decrease the lifespan of the flash memory device, the performance of the storage device may be improved if the workload of data is stored in a memory level cell having two or more bits per cell.

In operation 514, one or more flash management parameters of the storage device are recalibrated. The one or more flash management parameters may include tables, garbage collection schedules, wear level frequency, and open block allocation. The recalibration of the one or more flash management parameters may be applied to the data storage device through a flash firmware update.

In one embodiment, the flash management parameters may be optimized to the workload of data if a storage system is processing completely sequential data by utilizing a relaxed garbage collection scheme. In another embodiment, the flash management parameters may be optimized to the workload of data if a storage system is repeatedly writing to the same logical block address by utilizing a more aggressive garbage collection scheme.

In operation 516, a programming rate of the storage device is recalibrated. For example, in the case of long bursts or writes of sequential data, the programming trim on the SLC of a flash memory device may be relaxed. Relaxing the programming trim on an SLC may provide for a faster programming rate in an SLC at the expense of an elevated bit error rate, and may allow better optimization of burst properties of the storage device. In one embodiment, the programming rate may be optimized if the data storage device is writing a large amount of data, but reading much less data. In another embodiment, the storage device may first write the long burst of sequential data to the SLC before moving or rewriting the long burst of sequential data to a memory level cell having a higher bit per cell.

By reconfiguring a data storage system based on the operating parameters or characteristics of one or more workloads of data, the data storage system can be optimized to function as efficiently as possible, and can be tailored according to the amount or type of workloads of data the storage system is processing. Recalibrating the partitioning of bits per cell of the flash memory devices, the flash management parameters, and the programming rate optimizes the storage device directly based on the operating parameters or characteristics of the storage system. As such, the storage device may periodically be reconfigured to adapt to changing conditions during operation, which results in a more durable storage device having an increased efficiency and longer lifespan.

In one embodiment, a method comprises receiving, by a controller of a data storage device, one or more workloads of data. A diagnosis of one or more operating parameters of the one or more workloads of data is performed. A partitioning of a flash memory device of the data storage device is recalibrated based on the diagnosis of the one or more workloads of data.

The one or more operating parameters may comprise queue depth, a logical block address access distribution, a transfer size distribution, a solid performance/burst, and a determined mix of sequential and random data of the one or more workloads of data. Recalibrating the partitioning of the flash memory device may comprise a partitioning of bits per cell. Recalibrating the partitioning of bits per cell may comprise storing the one or more workloads of data in a multi-level cell, a triple level cell, or a quadruple level cell of the flash memory device to provide for additional space in a single level cell of the flash memory device.

In another embodiment, a method comprises receiving a command to reconfigure a data storage device, and receiving, by a controller of the data storage device, one or more workloads of data. In response to the received command, one or more operating parameters of the one or more workloads of data are extracted. The one or more workloads of data are analyzed based on the extracted operating parameters. One or more flash management parameters of the data storage device are recalibrated based on the analysis of the one or more workloads of data.

The flash management parameters may comprise garbage collection schedules, wear level frequency, and open block allocation. The one or more workloads of data may be received through an encrypted interface of the controller. The command to reconfigure the data storage device may be received upon a first threshold being reached. The first threshold may be a predetermined amount of time. The recalibrating of the one or more flash management parameters may be applied to the data storage device through a flash firmware update.

In one embodiment, a data storage device comprises one or more flash memory devices. The one or more flash memory devices comprise a plurality of memory cells. A controller is coupled to the one or more flash memory devices. The controller is configured to receive one or more workloads of data. A diagnostic module is coupled to the controller. The diagnostic module is configured to bypass storing the one or more workloads of data in a first memory cell of the plurality of memory cells. The first memory cell comprises a single level cell. The diagnostic module is further configured to store the one or more workloads of data in a second memory cell of the plurality of memory cells. The second memory cell is configured to store two or more bits per cell.

The second memory cell may comprise a triple level cell. The second memory cell may comprise a multi-level cell. The second memory cell may comprise a quadruple level cell. The diagnostic module may be further configured to: perform a diagnosis of one or more operating parameters of the one or more workloads of data based on a command to reconfigure the storage device. The diagnostic module may be further configured to: recalibrate partitioning of the one or more flash memory devices based on the diagnosis of the one or more workloads of data. The recalibrating partitioning of the one or more flash memory devices may comprise a partitioning of bits per cell. The diagnostic module may be further configured to: recalibrate one or more flash management parameters of the storage device based on the diagnosis of the one or more workloads of data. The diagnostic module may be further configured to: recalibrate a programming rate of the storage device based on the diagnosis of the one or more workloads of data. The data storage device may further comprise an encrypted interface coupled to the one or more flash memory devices and the controller.

The one or more workloads of data may comprise sequential data. A programming trim of the sequential data may be reduced to increase the programming rate. The sequential data may be first stored in the first memory cell prior to being moved to the second memory cell.

In another embodiment, a data storage system comprises a host device and a storage device coupled to the host device. The storage device further comprises one or more flash memory devices and a controller coupled to the one or more flash memory devices. The controller is configured to receive one or more workloads of data. The data storage device further comprises a diagnostic module coupled to the controller. The diagnostic module is configured to receive a first command to reconfigure the storage device based on a detected configuration change in a first workload of data, perform a first diagnosis of one or more operating parameters of a first workload of data, and recalibrate a partitioning of bits per cell of the one or more flash memory devices based on the first diagnosis of the first workload of data. The diagnostic module is further configured to receive a second command to reconfigure the storage device, perform a second diagnosis of one or more operating parameters of the second workload of data, and recalibrate one or more flash management parameters of the data storage device based on the second diagnosis of the second workload of data.

The second command to reconfigure the storage device may be received after a set number of program rate cycles have been performed. The set number of program rate cycles performed may be 100 program rate cycles. The second command to reconfigure the storage device may be received from a user of the storage system.

In yet another embodiment, a data storage device comprises one or more flash memory devices comprising a plurality of memory cells, means for extracting one or more operating parameters of the one or more workloads of data, means for analyzing the one or more workloads of data based on the extracted operating parameters, and means for recalibrating one or more data storage device parameters based on the analysis of the workload data. The means for recalibrating one or more data storage device parameters further comprises means for storing one or more workloads of data in a multi-level cell, a triple level cell, or a quadruple level cell of the one or more memory devices to provide for additional space in a single level cell of the one or more memory devices.

The storage device may further comprise means for recalibrating a programming rate of the storage device based on the diagnosis of the one or more workloads of data. The one or more operating parameters comprise queue depth, a logical block address access distribution, a transfer size distribution, a solid performance/burst, and a determined mix of sequential and random data of the one or more workloads of data.

While the foregoing is directed to embodiments of the present disclosure, other and further embodiments of the disclosure may be devised without departing from the basic scope thereof, and the scope thereof is determined by the claims that follow.

What is claimed is:
1. A method, comprising:
receiving, by a controller of a data storage device, one or more workloads of data, wherein the one or more workloads of data comprise a mixture of random and sequential data;

detecting, by the controller of the data storage device, a configuration change, wherein the configuration change is at least a change in a type of data from either sequential to random or random or sequential of the one or more workloads of data being received;

receiving a command to recalibrating a partitioning of the data storage device when the configuration change is detected;

performing a diagnosis of one or more operating parameters of the one or more workloads of data; and recalibrating the partitioning of the data storage device and a programming rate or a programming trim of the data storage device in response to receiving the command, wherein the data storage device comprises two or more memory areas, wherein each of the two or more memory areas comprise a different number of bits per cell, wherein the recalibrating the partitioning comprises dividing at least one of the two or more memory areas into two or more partitions, and wherein each of the two or more partitions have a different programming trim or a different programming rate.

2. The method of claim 1, wherein the one or more operating parameters comprise queue depth, a logical block address access distribution, a transfer size distribution, a solid performance/burst, and a determined mix of sequential and random data of the one or more workloads of data.

3. The method of claim 1, wherein recalibrating the partitioning of the data storage device further comprises a partitioning of the bits per cell.

4. The method of claim 3, wherein recalibrating the partitioning of bits per cell comprises storing the one or more workloads of data in a multi-level cell, a triple level cell, or a quadruple level cell of the data storage device to provide for additional space in a single level cell of the data storage device.

5. A method, comprising:
receiving a command to reconfigure a data storage device, wherein the data storage device comprises one or more flash memory devices, wherein each of the one or more flash memory devices comprise one or more memory areas, and wherein each of the one or more memory areas comprise a different number of bits per cell;
receiving, by a controller of the data storage device, one or more workloads of data, wherein the one or more workloads of data comprise a mixture of random and sequential data;
extracting, in response to the received command, one or more operating parameters of the one or more workloads of data;
analyzing the one or more workloads of data based on the extracted operating parameters;
detecting, by the controller, a configuration change of the one or more workloads of data, wherein the configuration change is at least a change in a type of data from either sequential to random or random or sequential of the one or more workloads of data being received; and
recalibrating one or more flash management parameters and a programming rate or a programming trim of the data storage device based on the analysis of the one or more workloads of data when the configuration change is detected, wherein the recalibrating the one or more flash management parameters further comprises dividing each of the one or more memory areas into two or more partitions, wherein each of the two or more partitions have a different programming trim or a different programming rate.

6. The method of claim 5, wherein the flash management parameters comprise garbage collection schedules, wear level frequency, and open block allocation.

7. The method of claim 5, wherein the one or more workloads of data are received through an encrypted interface of the controller.

8. The method of claim 5, wherein the command to reconfigure the data storage device is received upon a first threshold being reached.

9. The method of claim 8, wherein the first threshold is a predetermined amount of time.

10. The method of claim 5, wherein the recalibrating of the one or more flash management parameters are applied to the data storage device through a flash firmware update.

11. A storage device, comprising:
one or more flash memory devices, wherein each of the one or more flash memory devices comprise a plurality of memory cells, and wherein each of the plurality of memory cells comprise a different number of bits per cell;
a controller coupled to the one or more flash memory devices, wherein the controller is configured to:
receive one or more workloads of data, wherein the one or more workloads of data comprise a mixture of random and sequential data;
detect a configuration change of the one or more workloads of data, wherein the configuration change is at least a change in a type of data from either sequential to random or random or sequential of the one or more workloads of data being received; and
receive a command to recalibrating a partitioning of the flash memory device when the configuration change is detected; and
a diagnostic module coupled to the controller, the diagnostic module configured to:
bypass storing the one or more workloads of data in a first memory cell of the plurality of memory cells, wherein the first memory cell comprises a single level cell;
store the one or more workloads of data in a second memory cell of the plurality of memory cells, the second memory cell configured to store two or more bits per cell; and
recalibrate at least one of the plurality of memory cells into two or more partitions and a programming rate or a programming trim in response to receiving the command to recalibrate, wherein each of the two or more partitions have a different programming trim or a different programming rate.

12. The storage device of claim 11, wherein the second memory cell comprises a triple-level cell.

13. The storage device of claim 11, wherein the second memory cell comprises a multi-level cell.

14. The storage device of claim 11, wherein the second memory cell comprises a quadruple-level cell.

15. The storage device of claim 11, wherein the diagnostic module is further configured to: perform a diagnosis of one or more operating parameters of the one or more workloads of data based on a command to reconfigure the storage device.

16. The storage device of claim 15, wherein the diagnostic module is further configured to: recalibrate a partitioning of the one or more flash memory devices based on the diagnosis of the one or more workloads of data.

17. The storage device of claim 16, wherein the recalibrating partitioning of the one or more flash memory devices comprises a partitioning of bits per cell.

18. The storage device of claim 15, wherein the diagnostic module is further configured to: recalibrate one or more flash management parameters of the storage device based on the diagnosis of the one or more workloads of data.

19. The storage device of claim 11, wherein a programming trim of the sequential data is reduced to increase the programming rate.

20. The storage device of claim 11, wherein the one or more workloads of data are first stored in the first memory cell prior to being moved to the second memory cell.

21. The storage device of claim 11, further comprising an encrypted interface coupled to the one or more flash memory devices and the controller.

\* \* \* \* \*